(12) United States Patent
Lewis et al.

(10) Patent No.: US 8,379,623 B2
(45) Date of Patent: Feb. 19, 2013

(54) COMBINING MOBILE VPN AND INTERNET PROTOCOL

(75) Inventors: Adam C. Lewis, Buffalo Grove, IL (US); Christophe Janneteau, Bois d'Arcy (FR); Alexandru Petrescu, Orsay (FR); George Popovich, Palatine, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 1150 days.

(21) Appl. No.: 11/775,307

(22) Filed: Jul. 10, 2007

(65) Prior Publication Data
US 2009/0016253 A1    Jan. 15, 2009

(51) Int. Cl.
*H04J 3/24* (2006.01)
*H04L 12/56* (2006.01)
*H04L 12/28* (2006.01)

(52) U.S. Cl. ......... 370/349; 370/392; 370/393; 370/397
(58) Field of Classification Search .......... 370/349, 370/392, 393, 394
See application file for complete search history.

(56) References Cited

U.S. PATENT DOCUMENTS

| | | | |
|---|---|---|---|
| 6,115,394 A | 9/2000 | Balachandran et al. | |
| 6,298,058 B1 | 10/2001 | Maher et al. | |
| 6,418,480 B1 | 7/2002 | Rijhsinghani | |
| 6,496,505 B2 | 12/2002 | La Porta et al. | |
| 6,658,463 B1 | 12/2003 | Dillon | |
| 6,708,218 B1 | 3/2004 | Ellington et al. | |
| 6,765,892 B1 | 7/2004 | Leung | |
| 6,769,000 B1 | 7/2004 | Akhtar | |
| 6,862,274 B1 * | 3/2005 | Tsao et al. | 370/338 |
| 6,987,762 B2 | 1/2006 | Shiota | |
| 6,993,039 B2 | 1/2006 | Borella | |

(Continued)

FOREIGN PATENT DOCUMENTS

| | | |
|---|---|---|
| EP | 1318647 A2 | 11/2003 |
| EP | 1548978 A1 | 6/2005 |

(Continued)

OTHER PUBLICATIONS

Thubert, P. et al.: IPv4 traversal for MIPv6 based mobile Routers draft-thubert-nemo-ipv4-traversal-01, Network Working Group Internet-Draft, Expires Nov. 20, 2003, Cisco Systems May 22, 2003, pp. 1-31.

(Continued)

*Primary Examiner* — Huy C Ho
(74) *Attorney, Agent, or Firm* — Jeffrey Jacobs; Anthony P. Curtis; Daniel R. Bestor (57) ABSTRACT

A method (200, 300, 400) of communicating an IPv6 packet (120) over an IPv4 based network (102). The method can include receiving the IPv6 packet to be communicated to a remote unit (104), encapsulating the IPv6 packet in an IPv4 transition packet (122), and communicating the IPv4 transition packet to an IPv4 MVPN (114) server configured to communicate the packet to the remote unit via infrastructure of an IPv4 radio access network. Another aspect of the present invention relates to a method of processing an IPv6 packet received over an IPv4 based network. The method can include receiving from an MVPN server an IPv4 formatted packet that is being communicated to a remote unit, and removing from the packet at least one IPv4 header to result in the packet being formatted in accordance with IPv6.

16 Claims, 6 Drawing Sheets

U.S. PATENT DOCUMENTS

| | | | |
|---|---|---|---|
| 7,032,242 | B1 | 4/2006 | Grabelsky et al. |
| 7,058,424 | B2 | 6/2006 | Gadgil et al. |
| 7,069,495 | B2 | 6/2006 | Soderberg et al. |
| 7,228,337 | B1 | 6/2007 | Bornstein et al. |
| 7,236,465 | B2 | 6/2007 | Banerjee et al. |
| 7,339,903 | B2 | 3/2008 | O'Neill |
| 7,356,628 | B2 | 4/2008 | Swartzentruber |
| 7,360,083 | B1 | 4/2008 | Ragireddy et al. |
| 7,386,881 | B2 | 6/2008 | Swander et al. |
| 7,400,627 | B2 | 7/2008 | Wu et al. |
| 7,430,617 | B2 | 9/2008 | Walsh et al. |
| 7,453,907 | B2 | 11/2008 | Jonsson et al. |
| 7,496,061 | B2 | 2/2009 | Oswal et al. |
| 7,623,517 | B2 | 11/2009 | Suzuki |
| 2001/0040895 | A1* | 11/2001 | Templin ........................ 370/466 |
| 2002/0018456 | A1 | 2/2002 | Kakemizu et al. |
| 2002/0026525 | A1 | 2/2002 | Armitage |
| 2002/0032798 | A1 | 3/2002 | Xu |
| 2002/0073227 | A1 | 6/2002 | Bunn et al. |
| 2002/0157024 | A1 | 10/2002 | Yokote |
| 2002/0188743 | A1 | 12/2002 | Schaffrath |
| 2003/0018715 | A1 | 1/2003 | O'Neill |
| 2003/0053450 | A1 | 3/2003 | Kubota et al. |
| 2003/0065812 | A1 | 4/2003 | Beier et al. |
| 2003/0073453 | A1* | 4/2003 | Basilier ........................ 455/503 |
| 2003/0076838 | A1 | 4/2003 | Shaio et al. |
| 2003/0231625 | A1 | 12/2003 | Calvignac et al. |
| 2004/0008706 | A1 | 1/2004 | Sakamoto et al. |
| 2004/0013118 | A1 | 1/2004 | Borella |
| 2004/0013130 | A1* | 1/2004 | Blanchet et al. .............. 370/466 |
| 2004/0095912 | A1 | 5/2004 | Gao et al. |
| 2004/0136476 | A1 | 7/2004 | Rosen et al. |
| 2004/0202167 | A1 | 10/2004 | Jonsson et al. |
| 2004/0221312 | A1 | 11/2004 | Kobayashi |
| 2004/0223465 | A1 | 11/2004 | Lee |
| 2004/0246964 | A1 | 12/2004 | Grimminger |
| 2004/0249973 | A1 | 12/2004 | Alkhatib et al. |
| 2004/0252683 | A1 | 12/2004 | Kennedy et al. |
| 2004/0264465 | A1 | 12/2004 | Dunk |
| 2004/0266420 | A1* | 12/2004 | Malinen et al. ............... 455/421 |
| 2005/0088977 | A1 | 4/2005 | Roch et al. |
| 2005/0099971 | A1 | 5/2005 | Droms et al. |
| 2005/0237962 | A1 | 10/2005 | Upp et al. |
| 2005/0281259 | A1 | 12/2005 | Mitchell |
| 2005/0281264 | A1 | 12/2005 | Hsu et al. |
| 2006/0034209 | A1 | 2/2006 | O'Neill |
| 2006/0072573 | A1 | 4/2006 | Broberg et al. |
| 2006/0105741 | A1 | 5/2006 | Suh et al. |
| 2006/0109801 | A1 | 5/2006 | Smith |
| 2006/0140177 | A1 | 6/2006 | Karhu |
| 2006/0171402 | A1 | 8/2006 | Moore et al. |
| 2006/0173968 | A1 | 8/2006 | Vaarala et al. |
| 2006/0262792 | A1 | 11/2006 | Rokui |
| 2006/0271780 | A1 | 11/2006 | Oswal et al. |
| 2006/0274672 | A1 | 12/2006 | Venkitaraman et al. |
| 2007/0070946 | A1 | 3/2007 | Dorenbosch et al. |
| 2008/0159299 | A1 | 7/2008 | Bu et al. |
| 2009/0168783 | A1 | 7/2009 | Mohan et al. |

FOREIGN PATENT DOCUMENTS

| | | | |
|---|---|---|---|
| WO | | 03010900 A1 | 2/2003 |

OTHER PUBLICATIONS

Jeong, Jaehoon et al.: Dynamic Tunnel Management Protocol for IPv4 Traversal of IPv6 Mobile Network, http://www-users.cs.umn.edu/%7Ejjeong/publications/international-conference/vtc2004-fall-nemo-jaehoon.pdf, pp. 1-4.

Soliman, Hesham et al.: Mobile IPv6 support for dual stack Hosts and Routers (DSMIPv6) draft-ietf-mip6-nemo-v4traversal-01.txt, http://www.ietiorg/internet-drafts/draft-ietf-mip6-nemo-v4traversal-01.txt, MIP6 Working Group, Internet-Draft, Expires Sep. 2006, pp. 1-44.

Navali, J. et al.: IPv6 over Network based Mobile IPv4 draft-navali-ip6-over-netmip4-00.txt, IPv6 over network based IPv4: draft-navali-ip6-over-netmip4-00.txt, network Working Group Internet-Draft, Expires Aug. 29, 2006, pp. 1-39.

Tsirtsis, G. et al.: Dual Stack Mobile IPv4 draft-tsirtsis-v-4-v6-mipv-4-01.txt, Personal Internet Draft, Expires Nov. 2006, pp. 1-19.

Graveman RFG Security R et al.: "Using IPsec to Secure IPv6-in-IPv4 Tunnels; rfc4891.txt", IETF Standard, Internet Engineering Task Force, IETF, CH, May 1, 2007, pp. 1-23.

Yi-Wen Liu et al.: "Dynamic external home agent assignment in mobile VPN", Vehicular Technology Conference, 2004, VTC2004-Fall, 2004 IEEE 60th Los Angeles, CA, USA Sep. 26-29, 2004, Piscataway, NJ, USA, IEEE, vol. 5, Sep. 26, 2004, pp. 3281-3285.

Haler Microsoft IETF S: "Support for Multicast over 6to4 Networks", draft-ietf-ngtrans-6to4-multicast-01.txt, Standard-Working-Draft, Internet Engineering Task Force, IETF, CH, vol. ngtrans, No. 1, Jun. 29, 2002, pp. 1-10.

Carpenter, B et al.: "Transmission of IPv6 over IPv4 Domains without Explicit Tunnels", (revised from draft-carpenter-ipng-6over4-04.txt), draft-ietf-ipngwg-6over4--04.txt, IETF Standard-Working-Draft, Internet Engineering Task Force, IETF, CH, vol. ipngwg, Oct. 1, 1998, pp. 1-9.

PCT International Preliminary Report Dated Jan. 21, 2010.

PCT International Search Report Dated Dec. 5, 2008.

Cain, B., et al., "Internet Group Management Protocol, Version 3," Request for Comments: 3376, The Internet Society, Oct. 2002.

European Office Action for related Application No. EP06814813 mailed on Jan. 30, 2012.

Final Office Action mailed on May 19, 2009 in related U.S. Appl. No. 11/463,628, Vidya Narayanan, filed Aug. 10, 2006.

Final Office Action mailed on Nov. 16, 2009 in related U.S. Appl. No. 11/555,019, Narayanan Venkitaraman, filed Oct. 31, 2006.

International Preliminary Report on Patentability for related International Application No. PCT/US2006/36181 mailed on Apr. 24, 2008.

International Preliminary Report on Patentability for related International Application No. PCT/US2007/81052 mailed on May 14, 2009.

International Search Report and Written Opinion for related International Application No. PCT/US2006/36181 mailed on Oct. 29, 2007.

International Search Report and Written Opinion for related International Application No. PCT/US2007/81052 mailed on Mar. 14, 2008.

Ishac, J., "Survey of Header Compression Techniques," NASA/TM 2001-211154, Glenn Research Center, Cleveland, OH, Sep. 2001.

Na, J., et al. "Secure Nested Tunnels Optimization Using Nested Path Information", NEMO Working Group, Internet Draft, Sep. 2003, 22 Pages.

Ng, C., et al., "Taxonomy of Route Optimization Models in The NEMO Context" NEMO Working Group, Internet Draft, Feb. 21, 2005 38 pages.

Nikander, P., et al., "A Bound End-To-End Tunnel (BEET) Mode for ESP," Network Working Group, Internet Draft, Jun. 30, 2004.

Non Final Office Action mailed Apr. 14, 2009 in related U.S. Appl. No. 11/249,637, Vidya Narayanan, filed Oct. 13, 2005.

Non Final Office Action mailed on Feb. 26, 2009 in U.S. Appl. No. 11/555,019, Narayanan Venkitaraman, filed Oct. 31, 2006.

Non Final Office Action mailed on Jun. 28, 2010 in related U.S. Appl. No. 11/463,628, Vidya Narayanan, filed Aug. 10, 2006.

Non Final Office Action mailed on Nov. 7, 2008 in related U.S. Appl. No. 11/463,628, Vidya Narayanan, filed Aug. 10, 2006.

Non Final Office Action mailed Sep. 22, 2008 in related U.S. Appl. No. 11/249,637, Vidya Narayanan, filed Oct. 13, 2005.

Notice of Allowance mailed Dec. 8, 2009 in related U.S. Appl. No. 11/249,637, Vidya Narayanan, filed Oct. 13, 2005.

Notice of Allowance mailed on Aug. 26, 2011 in related U.S. Appl. No. 11/463,628, Vidya Narayanan, filed Aug. 10, 2006.

Notice of Allowance mailed on Jun. 1, 2011 in related U.S. Appl. No. 11/463,628, Vidya Narayanan, filed Aug. 10, 2006.

Supplementary European Search Report for related European Application No. EP06814813, European Patent Office, The Hague, Netherlands, mailed on Jun. 15, 2011.

Thubert, P., et al., "IPv6 Reverse Routing Header and its Application to Mobile Networks", Network Working Group, Internet Draft, Feb. 14, 2007, 52 Pages.

* cited by examiner

COMBINING MOBILE VPN AND INTERNET PROTOCOL

BACKGROUND OF THE INVENTION

1. Field of the Invention

The present invention generally relates to communications systems and, more particularly, to communications systems which communicate using the Internet Protocol.

2. Background of the Invention

The Internet Protocol (IP) is a network layer protocol that provides unique global computer addressing on a packet switched communications inter-network, such as the Internet, thereby enabling two communication devices communicating over the inter-network to uniquely identify one another. Version 4 of the Internet Protocol (IPv4) is the fourth iteration of Internet Protocol, but is the first version of the protocol to be widely deployed. Apart from IPv6, IPv4 is the only network layer protocol used on the Internet.

IPv4 uses 32-bit (4-byte) addresses, which limits the number of possible unique IP addresses to approximately 4.3 billion. With the current global population approaching 7 billion people, the IPv4 address space is not adequate to assign a unique IP address to every living person. Thus, as use of the Internet continues to expand throughout the world, the number of IP addresses available using IPv4 soon will be consumed and an IPv4 address shortage appears to be inevitable.

The address limitation inherent in IPv4 has helped stimulate the push towards IPv6, which uses 128-bit (16-byte) addresses. This provides enough room for approximately $3.4 \times 10^{38}$ unique addresses, which should provide adequate address space for the foreseeable future.

The migration from IPv4 to IPv6 is multifaceted and non-trivial, however. Indeed, for some time IPv4 and IPv6 will co-exist and devices configured to communicate with one another using IPv6 may find themselves separated by infrastructure that exclusively supports IPv4. Thus, there exists a need to enable IPv6 devices to communicate over an IPv4 network. Some solutions have been proposed to address this need, but such solutions are inefficient, insecure, or do not adequately accommodate the ever expanding mobile communications environment.

SUMMARY OF THE INVENTION

The present invention relates to a method of communicating an IPv6 packet over an IPv4 based network. The method can include receiving the IPv6 packet to be communicated to a remote unit, encapsulating the IPv6 packet in an IPv4 transition packet, and communicating the IPv4 transition packet to an IPv4 mobile VPN (MVPN) server configured to communicate the packet to the remote unit via infrastructure of an IPv4 radio access network.

Another aspect of the present invention relates to a method of processing an IPv6 packet received over an IPv4 based network. The method can include receiving from an MVPN server an IPv4 formatted packet that is being communicated to a remote unit, and removing from the packet at least one IPv4 header to result in the packet being formatted in accordance with IPv6.

The present invention also relates to a method of communicating an IPv6 packet over an IPv4 based network, which can include receiving from a transition gateway an IPv6 packet to be communicated to a remote unit, appending to the packet a mobile VPN (MVPN) tunnel header formatted in accordance with IPv4, and communicating the IPv6 packet to the remote unit via infrastructure of an IPv4 radio access network.

Another aspect of the present invention relates to a method of communicating an IPv6 packet, which includes receiving from a remote unit an IPv4 packet via infrastructure of an IPv4 radio access network. The IPv4 packet can include an encapsulated IPv6 packet. A mobile VPN (MVPN) tunnel header formatted in accordance with IPv4 can be removed from the IPv4 packet to un-encapsulate the IPv6 packet from the IPv4 packet. The IPv6 packet then can be communicated to a transition gateway.

BRIEF DESCRIPTION OF THE DRAWINGS

Various embodiments of the present invention will be described below in more detail, with reference to the accompanying drawings, in which.

DETAILED DESCRIPTION

While the specification concludes with claims defining features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

The present invention relates to a method and a system that enables Internet Protocol version 6 (IPv6) devices to efficiently communicate over an Internet Protocol version 4 (IPv4) radio access network using a mobile virtual private network (MVPN) tunnel. Moreover, such devices can communicate IPv6 multicasts over the IPv4 radio access network, over both IPv4 unicast tunnels and IPv4 multicast tunnels.

Figure 1:
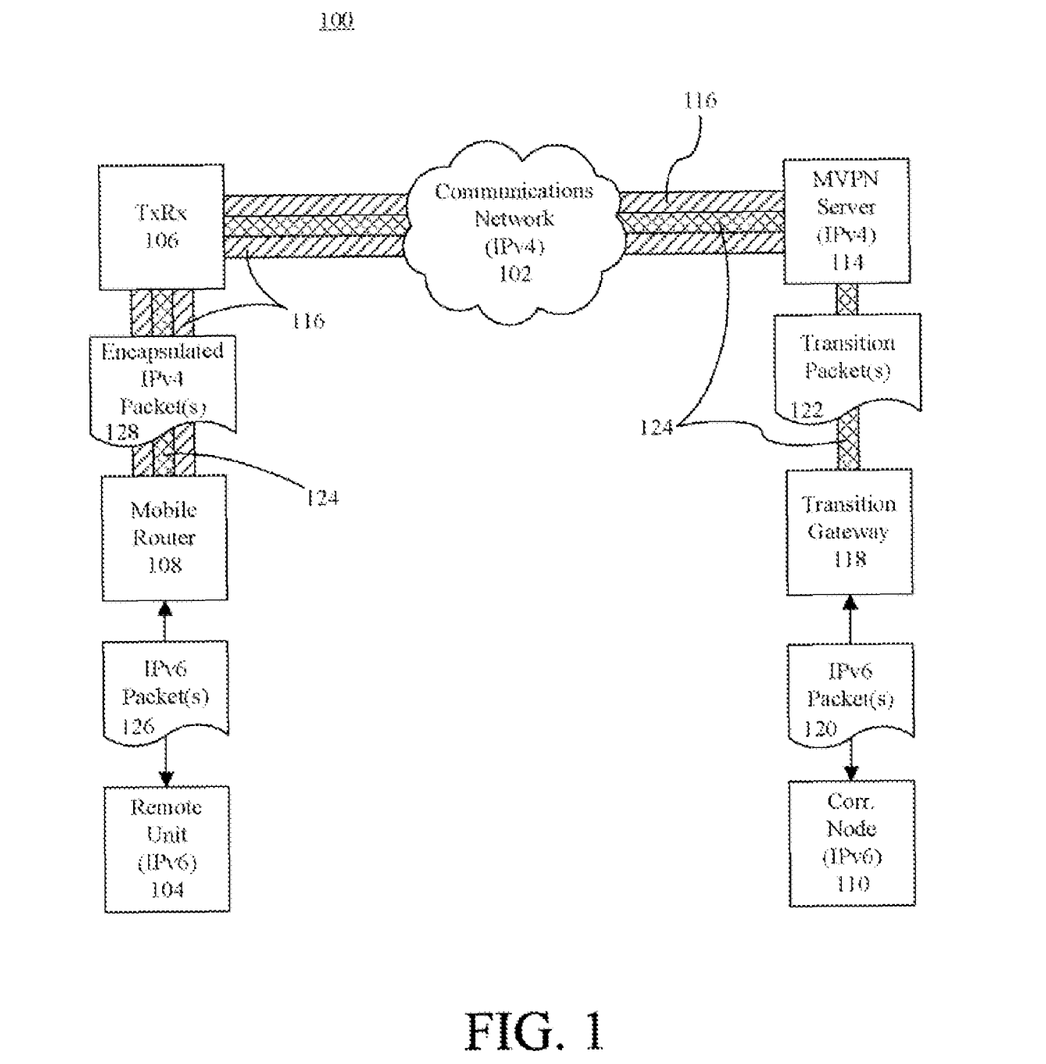
FIG. 1 depicts a communications system that is useful for understanding the present invention.

FIG. 1 depicts a communications system 100 that is useful for understanding the present invention. The communications system 100 can include a communications network 102 which supports an IPv4 network layer. The communications network 102 may comprise any suitable network infrastructure, for example a wide area network (WAN), such as the Internet, the World Wide Web, a cellular communications network, a public switched telephone network (PSTN), and the like. Other examples of suitable network infrastructure may include, but are not limited to, a radio access network (RAN), a local area network (LAN), a metropolitan area network (MAN), a WiFi network, a Mesh network, a public safety network (e.g. Astro, TETRA, HPD, etc) and/or any other networks or systems over which communication signals can be propagated. In that regard, the communications network 102 can include wired and/or wireless communication links.

The communications network 102 can be configured to communicate data via IEEE 802 wireless communications, for example, 802.11 and 802.16 (WiMAX), 3 G, 4 G, WPA, WPA2, GSM, TDMA, CDMA, WCDMA, OFDM, direct wireless communication, or any other communications format. Indeed, the communications network 102 can be implemented in accordance with any suitable communications standards, protocols, and/or architectures, or a suitable combination of such standards, protocols, and/or architectures.

The system 100 also can include at least one remote unit 104 configured to communicate via a communications network using the IPv6 network layer protocol. The remote unit 104 can be, for instance, a mobile station (e.g. a mobile telephone, a mobile radio, a mobile computer, a mobile router, a personal digital assistant, or the like), a computer, a wireless gaming device, an access terminal, a subscriber station, user equipment, or any other device suitably configured to communicate via an IPv6 communications network. As such, the remote unit 104 can comprise one or more processors/controllers, one or more network adapters/transceivers, and/or other suitable components.

In one arrangement, the remote unit 104 can wirelessly access the communications network via a transceiver 106 that is part of the infrastructure of a radio access network, for instance an IPv4 radio access network. The transceiver 106 can be a component of an access point, a base transceiver station, a repeater, or any other radio access network node that provides wireless access to the communications network 102. In another arrangement, the remote unit 104 can connect to the transceiver 106 via a mobile router 108. The mobile router 108 can be a mobile network controller, although the invention is not limited in this regard and the mobile router 108 can be any device that supports a communication link between the remote unit 104 and the transceiver 106. The remote unit 104 can communicate with the mobile router 108 via a wired or a wireless communication link. In one arrangement, the mobile router 108 and the remote unit 104 may be components of a LAN or an IP sub-network.

The system 100 can include a correspondent node 110 with which the remote unit 104 may communicate. The correspondent node 110 can be another remote unit, an application server, a terminal, or any other network node suitable for communicating with the remote unit 104. In an arrangement in which the correspondent node 110 is an application server, the correspondent node 110 can provide applications and services that are available to the remote unit 104. Examples of such applications and services can include, but are not limited to, communication services, messaging services, download services, global positioning services, gaming applications, and so on.

The system 100 also can include a mobile virtual private network (MVPN) server 114. The MVPN server 114 can be configured to support mobile virtual private networking over the communications network 102 using the IPv4 network layer protocol. For example, the MVPN server 114 can support an IPv4 MVPN tunnel 116 established between itself and the remote unit 104 or the mobile router 108. The IPv4 MVPN tunnel 116 can comprise a VPN security tunnel nested within a mobility tunnel. The IPv4 MVPN tunnel 116 can be a unicast tunnel or a multicast tunnel.

A transition gateway 118 can be provided to configure packets 120 communicated in accordance with IPv6, for instance those packets received from the correspondent node 110, such that the packets 120 can be communicated via the IPv4 communications network 102. The transition gateway 118 may or may not be collocated with the MVPN server 114. In an arrangement in which the MVPN server 114 and the transition gateway 118 are not collocated, the transition gateway 118 can encapsulate the IPv6 packets 120 into IPv4 transition packets (hereinafter "transition packets") 122 using an IPv6 to IPv4 transition header. As used herein, an IPv6 to IPv4 transition header is a header that may be appended to an IPv6 packet, but is formatted in accordance with the IPv4 protocol and includes IPv4 source and destination addresses. During such encapsulation, the transition gateway 118 can associate the IPv6 destination addresses contained in the headers of the packets 120 to corresponding IPv4 addresses.

The transition gateway 118 then can forward the transition packets 122 to the MVPN server 114, for example via an IPv6 transition tunnel 124. As used herein, an IPv6 transition tunnel is a tunnel over which IPv6 packets can be communicated using IPv4 routing schemes. The IPv6 transition tunnel can be implemented by appending the IPv6 to IPv4 transition headers to IPv6 packets 120. In an arrangement in which the MVPN server 114 and the transition gateway 118 are collocated, the IPv6 to IPv4 transition header may not be required, though it still may be used to provide the transition tunnel 124 across the communications network 102 (e.g. nested within the IPv4 MVPN tunnel 116). The transition tunnel 124 can terminate at the mobile router 108, at the network node containing the transceiver 106, or elsewhere.

Just as the transition gateway can encapsulate the IPv6 packets 120, the mobile router 108 (or the remote unit 104) also can encapsulate IPv6 packets 126 into IPv4 packets 128 using an IPv6 to IPv4 transition header. For example, the mobile router 108 can correlate the IPv6 source and destination addresses contained in the headers of the packets 126 to corresponding IPv4 addresses. The mobile router 108 also can forward the encapsulated packets 128 to the transition gateway 118 via the IPv6 transition tunnel.

Figure 2:
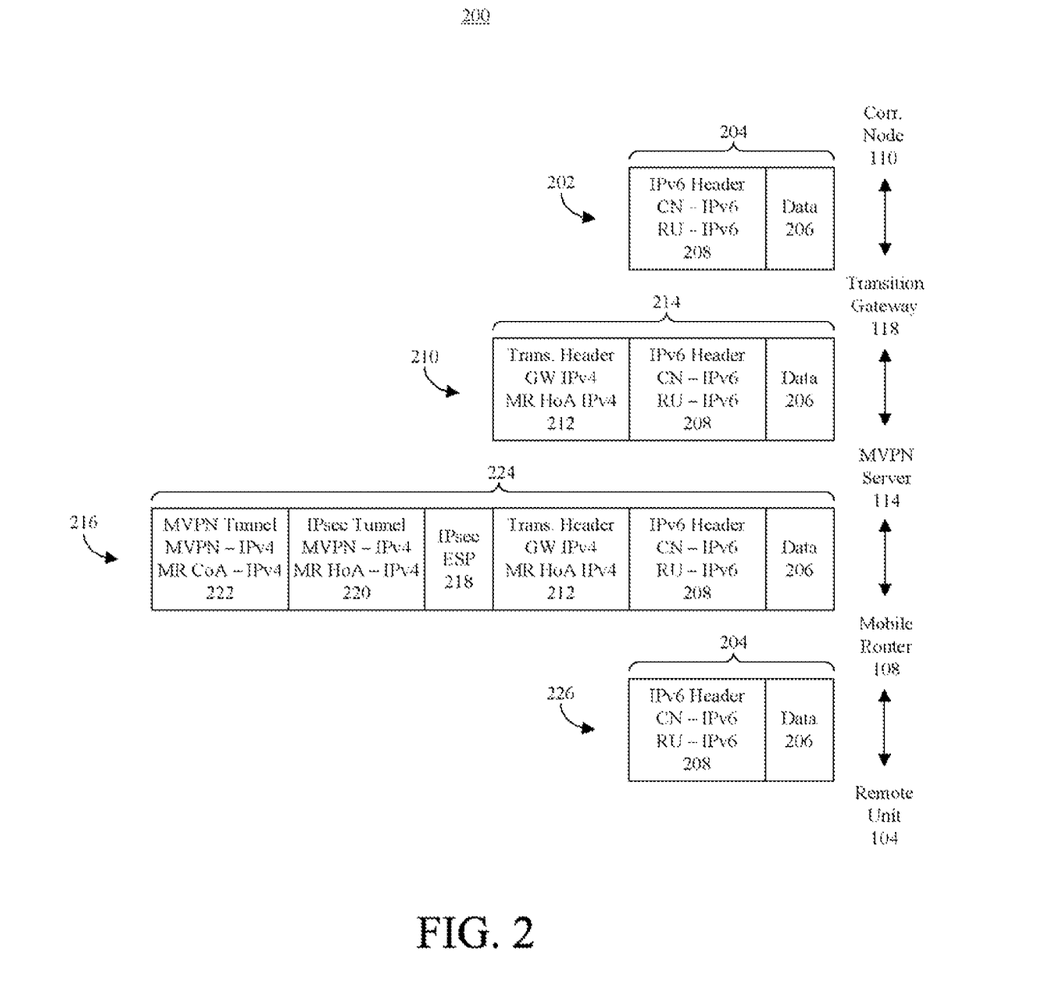
FIG. 2 is a diagram that depicts a packet tunneling implementation that is useful for understanding the present invention.

FIG. 2 is a diagram 200 that depicts a packet tunneling implementation that is useful for understanding the present invention. In downstream mode, at step 202 the correspondent node 110 can communicate an IPv6 packet 204 to the transition gateway 118. The IPv6 packet 204 can include data 206 and an IPv6 packet header 208. The header 208 of the IPv6 packet 204 can identify the IPv6 address of the correspondent node 110 and the IPv6 address of the remote unit 104. For example, the correspondent node 110 can set the source (src) attribute of the packet header to the IPv6 address of the correspondent node 110, and the destination (dest) attribute of the packet header 208 to the IPv6 address of the remote unit 104.

At step 210 the transition gateway 118 can append an IPv6 to IPv4 transition header (hereinafter "transition header") 212 to the IPv6 packet 204 to generate a transition packet 214, and communicate the transition packet 214 to the MVPN server 114. In one arrangement, a user datagram protocol (UDP) header also can be appended to the IPv6 packet 204, for example if the mobile router and/or remote unit are located behind a network address translator (NAT).

As used herein, the term "append" means to add additional information to the packet. The additional information can be appended to the beginning of the packet, the end of the packet, or in any other suitable location. The content of the data 206 and the content of the IPv6 header 208 can remain unchanged during the process of appending the transition header 212 to the IPv6 packet 204, and thus the IPv6 packet 204 may be referred to as being encapsulated within the appended packet, which also may be referred to as an IPv4 transition packet, or simply "transition packet" 214. Notwithstanding, the data 206 and IPv6 header 208 can be encrypted in accordance with a suitable tunnel protocol using a cryptographic key. One example of a suitable cryptographic key is a public key, and another example is a private key. Notwithstanding, other cryptographic keys can be used for encryption and the invention is not limited in this regard. The transition header 212 also may be encrypted, though this not need be the case.

The transition header 212 can identify the IP address of the transition gateway 118 and the home IP address of the mobile router 108, if present. Alternatively, if the remote unit 104 is linked to the communications system without the use of a mobile router, the transition header 212 can include the home IP address of the remote unit 104 in lieu of the mobile router home address. In the transition header 212, such addresses can be formatted in accordance with IPv4. For example, the transition gateway 118 can set the source attribute of the transition header 212 to the IPv4 address of the transition gateway 118 and the destination attribute of the transition header 212 to the IPv4 home address of the mobile router 108 (or remote unit 104).

In an arrangement in which a mobile router 108 is used to link the remote unit 104 to the communications system, the transition gateway 118 can identify the IPv4 home address of the mobile router 108 based on the IPv6 address of the remote unit 104. For example, the transition gateway 118 can select the IPv4 home address of the mobile router 108 from a data table or data file that associates IPv6 addresses of remote units with the IPv4 home addresses of their corresponding mobile routers. The data table (or data file) can be stored on the same equipment as the transition gateway 118, on the same equipment as the MVPN server 114, or on any other network node that may be accessed by the transition gateway 118. In one arrangement the data table can be static. In another arrangement, the data table can be dynamically updated when remote units connect or disconnect from mobile routers. For instance, the mobile routers can publish or otherwise communicate remote unit presence information that may be used to update the data table. In an arrangement in which a mobile network prefix of a mobile router corresponds to a range of IPv6 addresses that may be configured by remote units associated with the mobile router, the data table can be dynamically updated when the mobile routers configure or re-configure their IPv6 mobile network prefixes.

At step 216 the MVPN server 114 can append the transition packet 214 received from the transition gateway 118 with an Internet Protocol Security (IPsec) encapsulating security payload (ESP) 218, an IPsec tunnel header 220 and a mobile VPN (MVPN) tunnel header 222, which together can form an MVPN packet 224 that supports an IPv4 MVPN tunnel. The IPsec ESP 218 and IPsec tunnel header 220 can provide a VPN tunnel in which the IPv6 transition tunnel may be nested, and the MVPN tunnel header 222 can provide a mobility tunnel in which the VPN tunnel may be nested. In an arrangement in which the system includes the mobile router 108, the MVPN server 114 can forward the MVPN packet 224 to the mobile router 108. Alternatively, the MVPN packet 224 can be forwarded directly to the remote unit 104. In another arrangement, the MVPN tunnel header 222 further can include a UDP header, for example if the mobile router and/or remote unit are located behind an NAT.

The IPsec tunnel header 220 can identify the IPv4 address of the MVPN server 114 and the IPv4 home address of the mobile router 108 (if used) or the IPv4 home address of the remote unit 104. The MVPN tunnel header 222 also can identify the IPv4 address of the MVPN server 114, but rather than identifying the home address of the mobile router 108 (or remote unit 104), the MVPN tunnel header 222 can identify the IPv4 "care of" address of the mobile router 108 (or remote unit 104). In this manner, the MVPN tunnel header 222 can be used to track the mobile router 108 (or the remote unit 104) if it happens to be roaming.

Whereas the MVPN server 114 can identify the IPv4 home address from the transition header 212, the IPv4 "care of" address of the mobile router 108 (or remote unit) can be selected from a data table or data file that associates an identifier, for example an IPv4 home address, to the IPv4 "care of" address. The data table (or data file) can be stored on the same equipment as the MVPN server 114, or on any other network node that may be accessed by the MVPN server 114. The data table can be dynamically updated whenever the mobile router 108 (or remote unit 104) establishes network presence via a transceiver, for instance during initial network entry or while roaming. In such an arrangement, the network nodes with which the transceivers are associated can publish or otherwise communicate mobile router presence information that may be used to update the data table. In another arrangement, the mobile router itself can publish or otherwise communicate its presence information that may be used to update the data table, for instance by the way of Mobile IPv4 signaling messages to the MVPN server.

At step 226 the mobile router 108 can remove the transition header 212, the IPsec ESP 218, the IPsec tunnel header 220 and the MVPN tunnel header 222 from the MVPN packet 224, and perform any authentication and/or decryption that may be required to extract the original IPv6 packet 204 from the MVPN packet 224. If the packet contains a UDP header, such header also can be removed. The mobile router 108 then can communicate the IPv6 packet 204 to the remote unit 104. If the remote unit 104 is not connected to a mobile router, the remote unit 104 can perform the removal of the IPsec ESP 218, the IPsec tunnel header 220 and the MVPN tunnel header 222, as well as the authentication and/or decryption.

For upstream mode, the same packets 204, 214, 224 may be generated, but in reverse order. For example, at step 226 the remote unit can generate the packet 204 and communicate the packet 204 to the mobile router 108. At step 216, the mobile router 108 can encapsulate the packet 204 within the packet 224 and add the transition header 212, the IPsec ESP 218, the IPsec tunnel header 220 and the MVPN tunnel header 222. The mobile router 108 then can communicate the packet 224 to the MVPN server 114. Of course, if a mobile router is not used, the remote unit 104 can encapsulate the packet 204 into the packet 224, add the headers 212, 220, 222 and IPsec ESP 218, and communicate the packet 224 to the MVPN server 114. At step 210 the MVPN server can remove the IPsec ESP 218, the IPsec tunnel header 220 and the MVPN tunnel header 222 from the packet 224 to form the transition packet 214, and communicate the transition packet 214 to the transition gateway 118. Finally, at step 202 the transition gateway 118 can remove the transition header 212, as well as perform any decryption that may be necessary to extract the packet 204, and communicate the packet 204 to the correspondence node 110.

Figure 3:
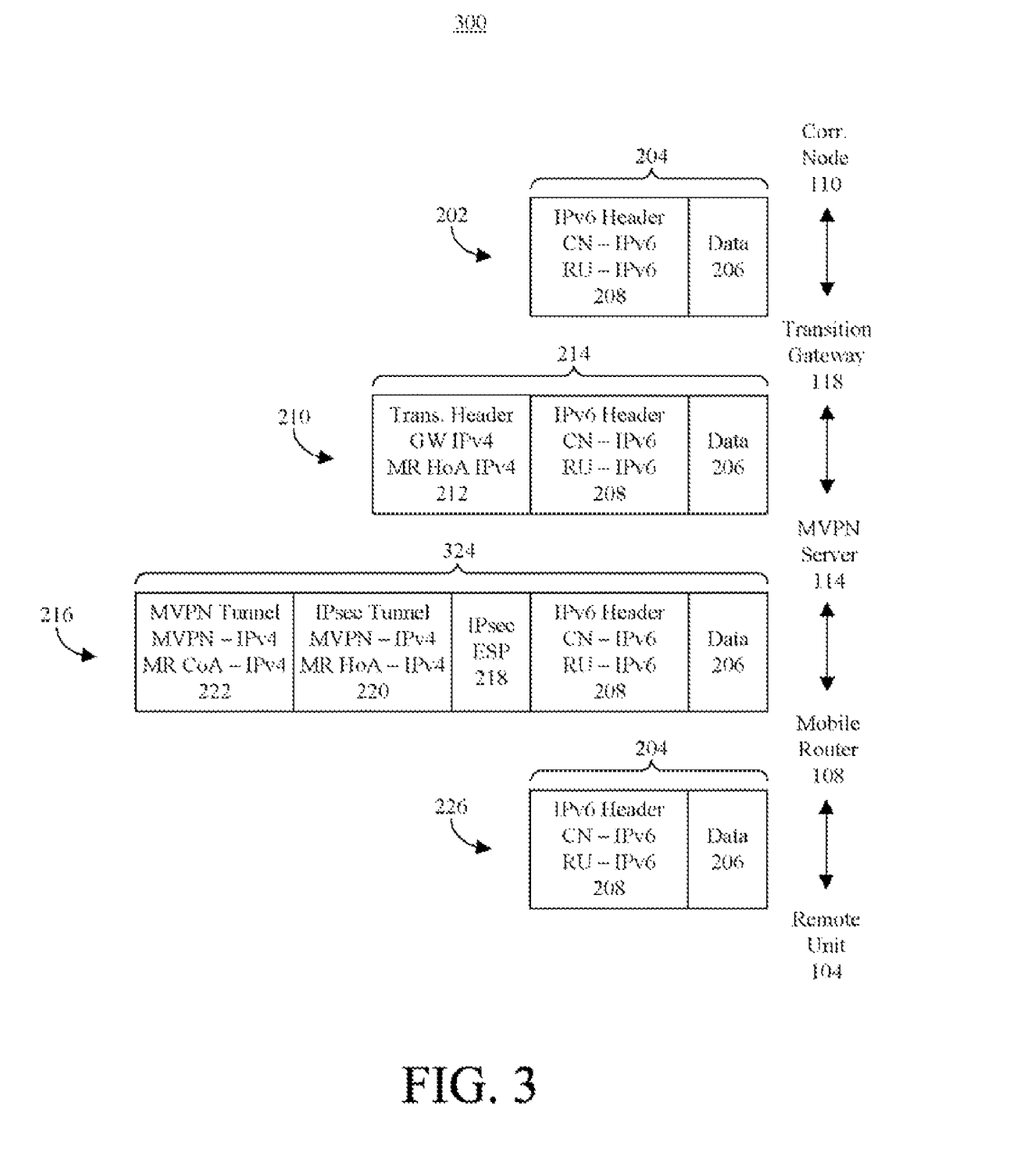
FIG. 3 is a diagram that depicts another packet tunneling implementation that is useful for understanding the present invention.

FIG. 3 is a diagram 300 that depicts another packet tunneling implementation that is useful for understanding the present invention. In the diagram 300, steps 202 and 210 can be performed as previously described for FIG. 2. However, because the MVPN server 114 has provided the IPv4 home address of the mobile router 108 (or remote unit 104) in the IPsec tunnel header 220, the transition header 212 may no longer be required to direct the MVPN packet 324 to the mobile router 108 or remote unit 104. Thus, at step 216, in addition to appending the IPsec ESP 218, the IPsec tunnel header 220, the MVPN tunnel header 222 and the UDP header (if present), the MVPN server 114 can remove the transition header 212 from the transition packet 214 to form an MVPN packet 324.

In one arrangement, such removal can be performed before the IPsec ESP 218, the IPsec tunnel header 220 and the MVPN tunnel header 222 are appended to the transition packet 214. Thus, the IPsec ESP 218, the IPsec tunnel header 220 and the MVPN tunnel header 222 can be appended directly to the IPv6 packet 204 to form the MVPN packet 324. The IPv6 header 208 and/or the data 206 can be decrypted before the IPv6 packet 204 is appended, though this need not be the case.

The IPsec ESP 218, the IPsec tunnel header 220 and the MVPN tunnel header 222 of the MVPN packet 324 can be used to establish an IPv4 MVPN tunnel without a nested IPv6 transition tunnel; the IPv6 transition tunnel can terminate at the MVPN server 114. Accordingly, at step 226, the mobile router 108 (or the remote unit 104) need only remove the IPsec ESP 218, the IPsec tunnel header 220 and the MVPN tunnel header 222 from the MVPN packet 324, as well as perform any applicable authentication and/or decryption, to arrive at the original IPv6 packet 204.

In a manner similar to that described for FIG. 2, the steps presented in FIG. 3 may be performed in reverse order for the upstream mode. However, rather than the mobile router 108 (or remote unit 104) appending the transition header 212 to the MVPN packet 324, the MVPN server 114 can append the transition header 212 to the MVPN packet 324, for example after the IPsec ESP 218, the IPsec tunnel header 220 and the MVPN tunnel header 222 have been removed.

Figure 4:
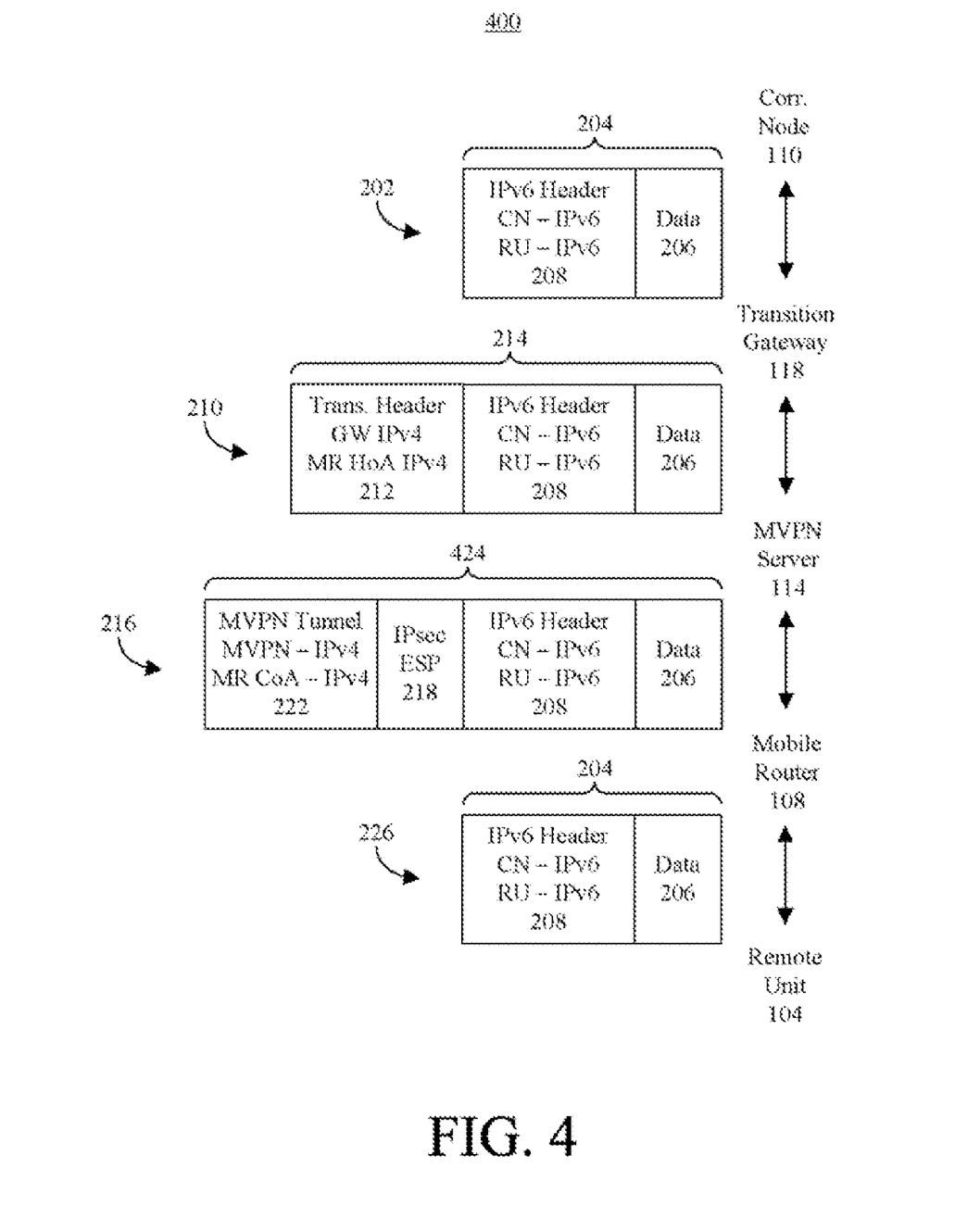
FIG. 4 is a diagram that depicts another packet tunneling implementation that is useful for understanding the present invention.

FIG. 4 is a diagram 400 that depicts yet another packet tunneling implementation that is useful for understanding the present invention. In the diagram 400, steps 202 and 210 again can be performed as previously described for FIG. 2 and FIG. 3. As noted, at step 216, the MVPN server 114 can remove the transition header 212 from the transition packet 214. In this arrangement, however, rather than appending the IPsec tunnel header to the transition packet 214, at step 216 the MVPN server 114 need only append the IPsec ESP 218 and MVPN tunnel header 222 to form an MVPN packet 424. The MVPN tunnel header 222 and the IPsec ESP 218 can be used to establish an IPv4 MVPN tunnel, again without a nested IPv6 transition tunnel. In an optional arrangement, an IPv4 extension header can be appended to the MVPN tunnel header 222 to indicate to the mobile router 108 (if used) or the remote unit 104 receiving the MVPN packet 424 that the IPsec tunnel header is not present, or otherwise has been removed, from the MVPN packet 424.

If the mobile router 108 is used, the IPv4 care of address for the mobile router 108 then can be used to route the MVPN packet 424 to the mobile router 108. If a mobile router is not used, the IPv4 care of address for the remote unit 104 can be used to route the MVPN packet 424 to the remote unit 104. In these arrangements, at step 226 the mobile router 108 (or remote unit 104) need only remove the IPsec ESP 218 and the MVPN tunnel header 222 from the MVPN packet 424, as well as perform any applicable authentication and/or decryption, to arrive at the original IPv6 packet 204. In another arrangement, the mobile router 108 (or remote unit 104) also can recreate a temporary IPsec tunnel header, using the MVPN server address included in the MVPN tunnel header 222 and the mobile router home address. The temporary IPsec tunnel header can be used to facilitate IPsec processing, such as authentication and decryption, on the received MVPN packet 424.

Further, in a manner similar to that described for FIG. 2, the steps presented in FIG. 4 may be performed in reverse order for upstream mode. The mobile router 108 (or remote unit 104) optionally may append an IPsec tunnel header to the IPv6 packet 204, though this is not required.

Figure 5:
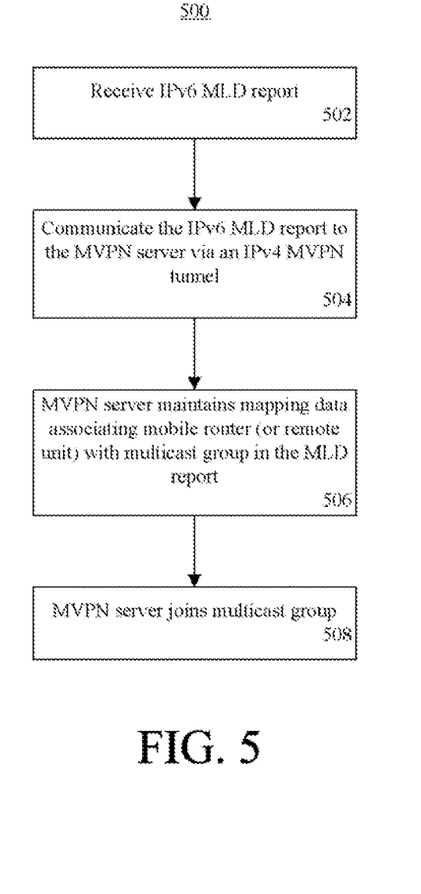
FIG. 5 is a flowchart presenting a method of preparing a system to receive an IPv6 multicast over an IPv4 unicast tunnel, which is useful for understanding the present invention.

FIG. 5 is a flowchart presenting a method 500 of preparing a system to receive an IPv6 multicast over an IPv4 unicast tunnel, which is useful for understanding the present invention. Beginning at step 502, the mobile router can receive an IPv6 multicast listener discovery (MLD) report from the remote unit wishing to subscribe to an IPv6 multicast group. The IPv6 MLD report can be received, for example, by middleware of the mobile router. In an arrangement in which a mobile router is not used, the middleware can be instantiated on the remote unit. In this arrangement, the middleware can receive the MLD report from an upper layer of the remote unit, for example from an application layer or a network layer.

At step 504, the mobile router (or remote unit) can communicate the IPv6 MLD report to the MVPN server via an IPv4 MVPN tunnel, for instance in accordance with a tunneling implementation previously described herein. At step 506 the MVPN server can maintain mapping data associating the mobile router (or remote unit) with the IPv6 multicast group identified in the MLD report. The MVPN server can maintain the mapping data by associating the IPv4 address of the mobile router (or remote unit) with an identifier for the IPv6 multicast group. Such association can be maintained in a data table or data file, or in any other suitable manner.

At step 508 the MVPN server can join the IPv6 multicast group. The MVPN server can join the IPv6 multicast groups using any of a variety of suitable techniques. For instance the MVPN server can forward the IPv6 MLD report, which was received via IPv4 MVPN tunnel, to an IPv6 multicast router. In another example, the MVPN server can issue its own IPv6 MLD report to an IPv6 multicast router. Such MLD report can include the IPv6 multicast address contained in the MLD report received over the IPv4 MVPN tunnel. In another arrangement, the MVPN server can directly join the IPv6 multicast group using IPv6 multicast routing protocol signaling instead of MLD messages, for instance if the MVPN server can itself act as an IPv6 multicast router. In yet another arrangement, if the MVPN server is not directly connected to an IPv6 multicast capable network, the MVPN server can communicate the MLD report to another network entity, as the transition gateway, which has connectivity to an IPv6 multicast routing infrastructure and which can trigger establishment of the IPv6 multicast branch on behalf of the MVPN server. Such MLD report can be communicated, for instance, via an IPv4 tunnel.

Figure 6:
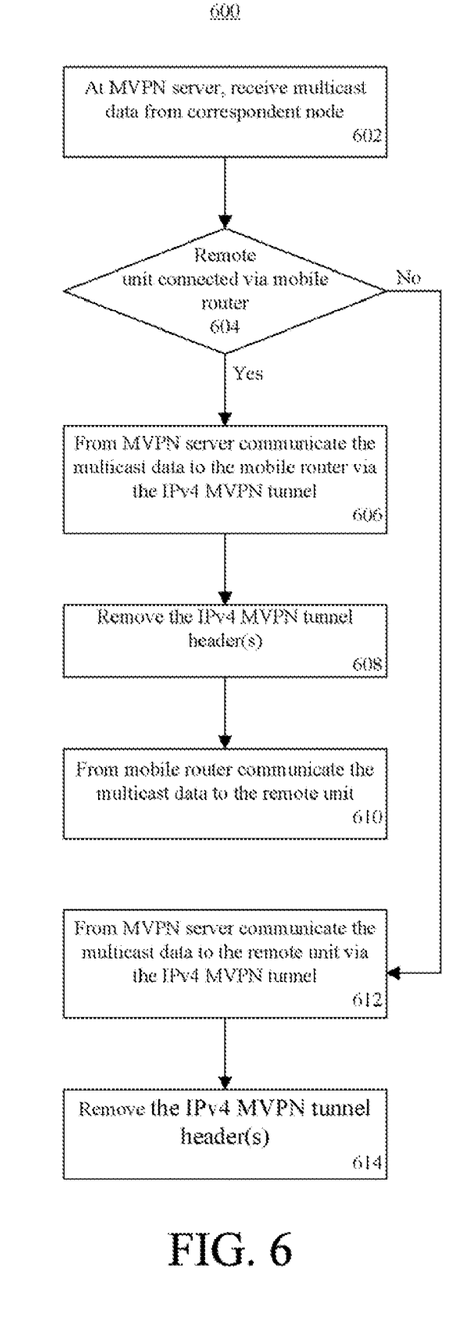
FIG. 6 is a flowchart presenting a method of communicating an IPv6 multicast over an IPv4 unicast tunnel, which is useful for understanding the present invention.

FIG. 6 is a flowchart presenting a method of communicating an IPv6 multicast over an IPv4 unicast tunnel, which is useful for understanding the present invention. At step 602, the MVPN server can receive multicast data from a correspondent node. If, however, the MVPN server has joined the IPv6 multicast group through another network entity, the MVPN server can receive the IPv6 multicast from the other network entity via an IPv4 tunnel.

Referring to decision box 604, in an arrangement in which the remote unit communicates with the MVPN server via a mobile router, at step 606 the MVPN server can access the mapping data to identify the mobile router, which has been associated with the IPv6 multicast group, and communicate the multicast data to the mobile router via the IPv4 MVPN tunnel. At step 608 the mobile router can remove the IPv4 MVPN tunnel header(s) to un-encapsulate the IPv6 multicast data packets prior to communicating such packets to the remote unit. To do so, the mobile router can remove any of the headers forming the IPv4 MVPN tunnel, such as the IPsec ESP, the IPsec tunnel header and the MVPN tunnel header, which may include IPv4 header information. Any UDP headers which may have been added to the multicast data also can be removed. At step 610 the mobile router can communicate the multicast to the remote unit.

Referring again to decision box 604, if a mobile router is not used to link the remote unit to the MVPN server, at step 612 the MVPN server can access the mapping data to identify the remote unit, which has been associated with the IPv6 multicast group, and communicate the multicast data to the remote unit via the IPv4 MVPN tunnel. At step 614 the remote unit can remove the IPv4 MVPN tunnel header(s) to un-encapsulate the IPv6 multicast data packets. Again, to do so, the mobile router can remove any of the headers forming the IPv4 MVPN tunnel such as the IPsec ESP, the IPsec tunnel header, the MVPN tunnel header, as well as a UDP header, if present.

Figure 7:
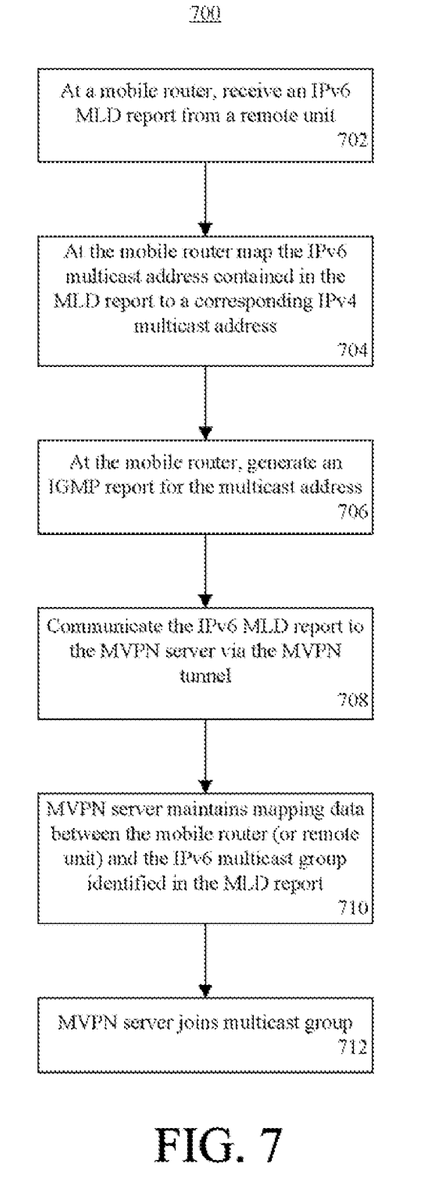
FIG. 7 is a flowchart presenting a method of preparing a system to receive an IPv6 multicast over an IPv4 multicast tunnel, which is useful for understanding the present invention.

FIG. 7 is a flowchart presenting a method of preparing a system to receive an IPv6 multicast over an IPv4 multicast tunnel, which is useful for understanding the present invention. Beginning at step 702, the mobile router can receive an IPv6 MLD report from the remote unit wishing to subscribe to a multicast. The IPv6 MLD report can be received, for example, by middleware of the mobile router. At step 704 the mobile router can map the IPv6 multicast address contained in the MLD report to a corresponding IPv4 multicast address. The mobile router can identify the IPv4 multicast address from a data table or data file accessible to the mobile router which maintains such mapping information. In another arrangement, the mobile router can get the mapping information from another entity in the network, for instance the MVPN server or the transition gateway.

At step 706 the mobile router can generate an Internet Group Management Protocol (IGMP) report for the IPv4 multicast address, thereby bypassing the MVPN tunnel and the MVPN server. In the IGMP report message, the mobile router can replace the source address, which may be a home address, with a topologically correct "care of" address for the mobile router in order to pass any ingress filtering mechanisms that may be implemented in the communications system. The use of the IGMP report in this manner can enable mobile routers to subscribe to IPv4 multicast groups in a manner which bypasses the MVPN tunnel and MVPN server.

At step 708, the mobile router can communicate the IPv6 MLD report to the MVPN server via an IPv4 MVPN tunnel, for instance in accordance with a tunneling implementation previously described herein. At step 710 the MVPN server can maintain mapping data between the mobile router (or remote unit) and the IPv6 multicast group identified in the MLD report. The MVPN server also can maintain mapping data between the address of the IPv6 multicast group and the address of its corresponding IPv4 multicast group. At step 712 the MVPN server can join the multicast group identified in the MLD report.

Figure 8:
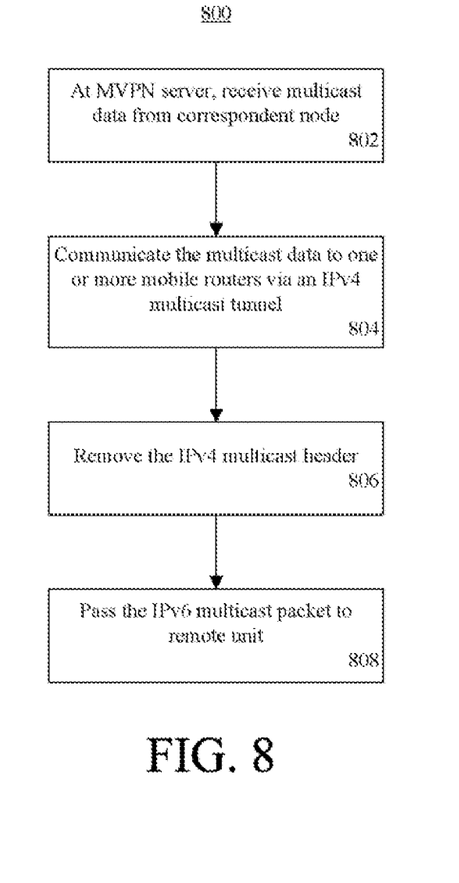
FIG. 8 is a flowchart presenting a method of communicating an IPv6 multicast over an IPv4 multicast tunnel, which is useful for understanding the present invention.

FIG. 8 is a flowchart presenting a method of communicating an IPv6 multicast over an IPv4 multicast tunnel, which is useful for understanding the present invention. At step 802 the MVPN server can receive IPv6 multicast data from a correspondent node. At step 804 the MVPN server can communicate the multicast data to one or more routers (and/or remote units) via an IPv4 multicast tunnel. To do so, the MVPN server can append at least one IPv4 header to the IPv6 multicast data packet. In one arrangement, a UDP header also can be appended to the multicast data packet. The destination address in the IPv4 header can be set to the IPv4 multicast address associated with the IPv6 multicast address of the data packet. This IPv4 multicast tunnel can be secured, e.g. using IPsec. At step 806, the routers (and/or remote units) can remove the IPv4 multicast headers from the multicast packets to un-encapsulate the IPv6 multicast data packets. At step 808 the mobile routers can communicate the IPv6 packets to the remote units. The remote units can communicate such packets to the appropriate data layers.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The present invention can be realized in hardware, software, or a combination of hardware and software. The present invention can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with an application that, when being loaded and executed, controls the processing system such that it carries out the methods described herein. The present invention also can be embedded in a program storage device readable by a machine, tangibly embodying a program of instructions executable by the machine to perform methods and processes described herein. The present invention also can be embedded in an application product which comprises all the features enabling the implementation of the methods described herein and, which when loaded in a processing system, is able to carry out these methods.

The terms "computer program," "software," "application," variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, an application can include, but is not limited to, a subroutine, a function, a procedure, an object method, an object implementation, an executable application, an applet, a servlet, a MIDlet, a source code, an object code, a shared library/dynamic load library and/or other sequence of instructions designed for execution on a processing system.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language).

This invention can be embodied in other forms without departing from the spirit or essential attributes thereof. Accordingly, reference should be made to the following claims, rather than to the foregoing specification, as indicating the scope of the invention.

What is claimed is:

1. A method of processing an IPv6 packet received over an IPv4 based network, the method comprising:
   receiving at a communication device, from a mobile virtual private network (MVPN) server an internet protocol version 4 (IPv4) packet via an IPv4 network that is being communicated to a remote unit, the IPv4 packet including encapsulated data, an internet protocol version 6 (IPv6) header, an internet protocol security (IPsec) tunnel header identifying the IPv4 address of the MVPN server and the first IPv4 address of the remote unit to form the IPv6 packet, and a MVPN tunnel header identifying an IPv4 address of the MVPN server and a first IPv4 address of the remote unit, but not including an IPv6 to IPv4 transition header identifying an IPv4 address of a transition gateway and a second IPv4 address of the remote unit; and
   forming, by the communication device, an internet protocol version 6 (IPv6) packet by removing from the IPv4 packet the MVPN tunnel header and the IPsec tunnel header without having to remove the IPv6 to IPv4 transition header.

2. The method of claim 1, wherein forming the IPv6 packet further comprises removing from the IPv4 packet an IPsec encapsulating security payload (ESP).

3. The method of claim 2, wherein the IPv4 packet consists of the IPv6 packet, the IPsec ESP, the IPsec tunnel header, and the MVPN tunnel header.

4. The method of claim 1, wherein the remote unit is a mobile router.

5. The method of claim 1, wherein the remote unit is a mobile station.

6. The method of claim 1, wherein the first address is a home address of the remote unit.

7. The method of claim 1, wherein the second address is a care of address of the remote unit.

8. The method of claim 1, wherein the IPv6 packet comprises an IPv6 multicast packet or the IPv4 packet comprises an IPv4 multicast packet.

9. A method of communicating an internet protocol version 6 (IPv6) packet over an internet protocol version 4 (IPv4) based network, the method comprising:
   receiving from a transition gateway, at an IPv4 mobile virtual private network (MVPN) server, an IPv4 transition packet including (i) an IPv6 to IPv4 transition header identifying an IPv4 address of the transition gateway and a first IPv4 address of the remote unit and (ii) an encapsulated IPv6 packet comprising an IPv6 header and data
   removing, at the MVPN server, the IPv6 to IPv4 transition header of the IPv4 transition packet and appending an MVPN tunnel header and an internet protocol security (IPsec) tunnel header to form a nested MVPN packet, the MVPN tunnel header identifying an IPv4 address of the MVPN server and a second IPv4 address of the remote unit and the IPsec tunnel header identifying the IPv4 address of the MVPN server and the first IPv4 address of the remote unit to form the IPv6 packet; and
   the MVPN server transmitting the nested MVPN packet towards the remote unit via an infrastructure comprising an IPv4 radio access network.

10. The method of claim 9, wherein the transition gateway and the MVPN server are collocated.

11. The method of claim 9, further comprising at the MVPN server appending an IPsec encapsulating security payload (ESP) after removing the IPv6 to IPv4 transition header and before appending the MVPN tunnel header and the IPsec tunnel header to form the nested MVPN packet.

12. The method of claim 11, wherein the nested MVPN packet consists of the IPv6 packet, the IPsec ESP, the IPsec tunnel header, and the MVPN tunnel header.

13. The method of claim 9, further comprising:
   prior to receiving the IPv4 transition packet, the MVPN server receiving an IPv6 multicast listener discovery (MLD) report generated by the remote unit; and
   joining an IPv6 multicast group identified in the MLD report;
   receiving an IPv6 multicast packet communicated to the IPv6 multicast group, appending an MVPN tunnel header and IPsec tunnel header to the IPv6 multicast packet to create a nested multicast MVPN packet, and transmitting the nested multicast MVPN packet towards the remote unit via an infrastructure comprising an IPv4 radio access network.

14. The method of claim 13, further comprising maintaining mapping data associating the remote unit with the IPv6 multicast group.

15. The method of claim 14, further comprising maintaining mapping data associating an IPv4 multicast group with the IPv6 multicast group.

16. The method of claim 14, further comprising directly mapping an IPv6 address of a mobile station to an IPv4 address of a mobile router serving the mobile station so that the IPv4 home address of the mobile router is identified based on the IPv6 address of the remote unit.

* * * * *

UNITED STATES PATENT AND TRADEMARK OFFICE
CERTIFICATE OF CORRECTION

PATENT NO. : 8,379,623 B2
APPLICATION NO. : 11/775307
DATED : February 19, 2013
INVENTOR(S) : Lewis et al.

It is certified that error appears in the above-identified patent and that said Letters Patent is hereby corrected as shown below:

In the Claims

In Column 12, Line 10, in Claim 9, delete "data" and insert -- data; --, therefor.

Signed and Sealed this
Fifteenth Day of October, 2013

Teresa Stanek Rea
*Deputy Director of the United States Patent and Trademark Office*